United States Patent
Smith

(10) Patent No.: US 8,113,570 B1
(45) Date of Patent: Feb. 14, 2012

(54) AERODYNAMIC NOSE CONE CAP

(76) Inventor: Edward John Smith, Brandon, FL (US)

( * ) Notice: Subject to any disclaimer, the term of this patent is extended or adjusted under 35 U.S.C. 154(b) by 0 days.

(21) Appl. No.: 12/798,557

(22) Filed: Apr. 7, 2010

(51) Int. Cl.
*B62D 35/00* (2006.01)
(52) U.S. Cl. .................................... 296/180.4
(58) Field of Classification Search ............. 296/180.1, 296/180.4, 181.5, 181.1, 182.1, 186.1, 186.4
See application file for complete search history.

(56) References Cited

U.S. PATENT DOCUMENTS

| | | | | |
|---|---|---|---|---|
| 2,514,695 A * | 7/1950 | Dempsey | | 296/208 |
| 3,415,566 A * | 12/1968 | Kerrigan | | 296/180.4 |
| 3,425,740 A * | 2/1969 | Vaughn | | 296/163 |
| 3,866,968 A * | 2/1975 | Donahue | | 296/180.4 |
| D243,597 S | 3/1977 | Headington, Jr. | | |
| 4,281,869 A * | 8/1981 | Saint | | 296/180.4 |
| D270,147 S * | 8/1983 | Faust | | D12/102 |
| 4,553,782 A * | 11/1985 | Markland | | 296/180.4 |
| 5,180,205 A * | 1/1993 | Shoop | | 296/180.2 |
| 5,487,586 A * | 1/1996 | Kinkaide | | 296/180.1 |
| 6,394,533 B1 * | 5/2002 | Ladell et al. | | 296/182.1 |
| 6,634,700 B1 * | 10/2003 | Calvert | | 296/180.4 |
| 6,644,706 B2 * | 11/2003 | Rolph | | 296/26.08 |
| 7,000,978 B1 * | 2/2006 | Messano | | 296/181.6 |
| 7,234,761 B1 * | 6/2007 | Crean | | 296/180.4 |
| D603,299 S * | 11/2009 | Prusmack | | D12/102 |
| 7,784,409 B2 * | 8/2010 | Iden et al. | | 105/1.1 |
| D626,891 S | 11/2010 | Smith | | |
| 7,841,280 B2 * | 11/2010 | Iden et al. | | 105/1.1 |
| 2010/0230999 A1 | 9/2010 | Setzer | | |

* cited by examiner

*Primary Examiner* — Glenn Dayoan
*Assistant Examiner* — Gregory Blakenship

(57) ABSTRACT

A molded hollow aerodynamic cap which is attached to the tongue part of the trailers frame. The cap extends from the hitch and is attached to the front of the trailer. The aerodynamic design of the cap gives the towing driver better handling control and fuel saving mileage. Inside the cap is used for storage and other purposes.

7 Claims, 7 Drawing Sheets

AERODYNAMIC NOSE CONE CAP

BACKGROUND OF THE INVENTION

1. Field of the Invention

The present new invention relates to trailer attachments and more particularly pertains to an aerodynamic nose cone cap addition attached to both the tongue part of the trailer frame and the front of the trailer body. Doors give entry to the covered extra space in the caps interior which can be used in several different ways including storage.

2. Description of the Prior Art

There are many different add on attachments that have been invented and recorded over the years. More specifically trailer attachments heretofore devised and utilized are known to consist basically of familiar expected and obvious structural configurations notwithstanding the myriad of designs encompassed by the crowded prior art which have been developed for the fulfillment of countless objectives and requirements.

Some known prior art in this area includes U.S. Pat. No. 5,979,972 which is an added platform attached to the tongue of the trailer frame. This doesn't give any aerodynamics to the front of the trailer and it is a disadvantage with wind resistance.

Another known in prior art is U.S. Pat. No. D 529412 S which is an added and attached container to the front of a camper trailer. This too doesn't give any aerodynamics help in wind resistance for the trailer which is a disadvantage. An additional one in prior art is U.S. Pat. No. 4,079,956 and D243597 which are the same invention and does offer less wind resistance and storage. The disadvantage is it still doesn't cover all of the tongue frame and doesn't extend to the hitch as show in FIG. 11 which means more wind resistance to the trailer and there are no doors for crawl in or walk in entry into the interior of the cap itself. This disadvantage of more wind resistance gives less NASCAR draft efficiency as well as less fuel efficiency. The interior also is not large enough for utility, workshop or hygiene usage and has inferior shape design.

SUMMARY OF INVENTION

This is a molded hollow aerodynamic nose cone cap that is attached to both the tongue part of the trailers frame and the front wall of the trailers body. A cap from a topographical view extends from the hitch to the front of the trailer body covering the tongue part of the trailers frame and any additions to it. This nose cone cap mounts onto and is attached to any additional modifications to the tongue part of the trailers frame. A floor is contoured to the interior shape of the cap and is attached to the cap and the tongue part of the trailers frame and any attachments or their modifications. A cap is constructed from a group of rigid materials preferably fiberglass, metal or any other suitable rigid material. An aerodynamic design of the wind resistant cap makes the trailer yield better handling control to the driver while at the same time saving on fuel with its lightweight and superior shape design. An interior space inside the cap can be used for storage, utility, workshop or hygiene purposes. At least one door with at least one lock is installed in the cap and depending on its design and size is used for crawl in or walk in entry into the caps interior. Entry can also be through the front wall trailer body door.

ADVANTAGES

Accordingly several advantages of one or more aspects are as follows: to provide a cap that is economical to purchase, that has low maintenance, that has an aerodynamic design, that the design has graceful functional lines, that the design of the cap yields better fuel economy for the driver, that the cap is light in weight, that the cap is strong, that the cap is durable, that the cap is built with quality, that the cap has at least one door, that the cap also comes with no doors, that the cap creates extra space, that the cap has sound deadening properties, that the cap has locks on the doors for security of items, that the cap has a smooth aerodynamic surface over a flat trailer front wall, that the cap has a high strength to thickness ratio, that the cap has a high strength to weight ratio, and that the cap facilitates paint or the use of the color in the mold.

These and other advantages of one or more aspects will be apparent from the consideration of the drawings and ensuing description.

DRAWINGS—LIST OF REFERENCE NUMBERS

Figure 1:
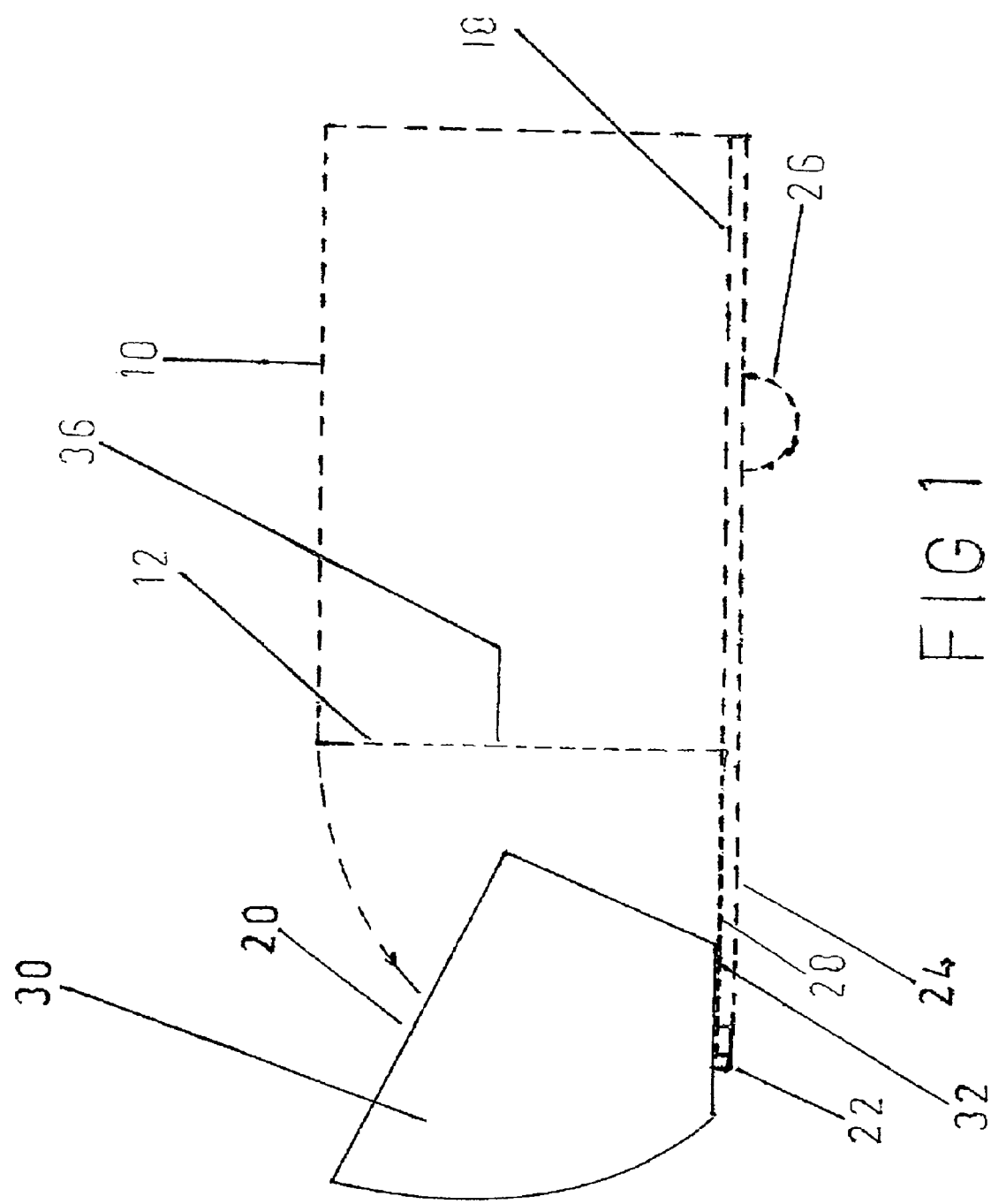
FIG. 1. is a left side view of a cap without doors of the preferred embodiment and the right side being a mirror of the same.

10—Trailer body
12—Front wall of trailer
14—Door
16—Lock
18—Frame
20—Cap
22—Hitch
24—Tongue of frame
26—Wheel
28—Floor
30—Interior cap space
32—Hinge
34—Aerodynamic design of a wind resistant cap
36—Front Wall of trailer body door

DETAILED DESCRIPTION

In reference to the purposes of the description hereinafter, the terms "left", "right", "frame ",", "tongue", and derivatives thereof, shall relate to the invention as it is oriented in the drawing figures. However, it is to be understood that the invention may assume various alternative variations, except where expressly specified to the contrary. It is also to be understood that the specific devices illustrated in the attached drawings, and described in the following specifications, are simply exemplary embodiments of the invention. Hence, specific dimensions and other physical characteristics related to the embodiments disclosed herein are not to be considered limiting in the invention.

While looking at FIG. 1, it shows an preferred embodiment of the invention a molded hollow aerodynamic nose cone cap 20, which is generally one piece of rigid fiberglass or any other rigid workable material. This aerodynamic nose cone cap is for mounting onto the tongue part of the trailers frame 24. The cap design comes in two styles solid without doors as shown in FIG. 1 and with at least one door 14, which is in FIG. 2. For security purposes at least one lock 16 is on the door 14. This aerodynamic nose cone cap is attached to both the tongue part of the trailer frame 24 and the front wall of the trailers body 12. The trailer body 10 is also seen attached to the cap 20 at the common attaching point of the front wall of the trailer 12. Also shown are the trailers frame 18 and at least two wheels 26. Although this aerodynamic nose cone cap 20 was built with the intentions of a ATV trailer in mind and crawl in entry. A larger scale design molded hollow aerodynamic nose cone cap 20 with doors 14 has walk in entry. Entry can also be through the front wall of the trailer body door 36. A floor 28 is attached to both the cap 20 and the tongue part of the trailers frame 24. An interior cap space that is created inside the cap can be used for a variety of things such as: storage, utility, workshop, and hygiene purposes. This is a wind resistant cap 20, that is designed to yield better handling control and fuel saving. A hitch 22 can also be seen attached to the tongue part of the trailer frame 24. The created interior cap space 30 in a cap without doors still can be used with the use of a tilt forward hinge 32. Said cap 20 aerodynamic design makes the trailer easier to tow while saving on fuel.

Figure 2:
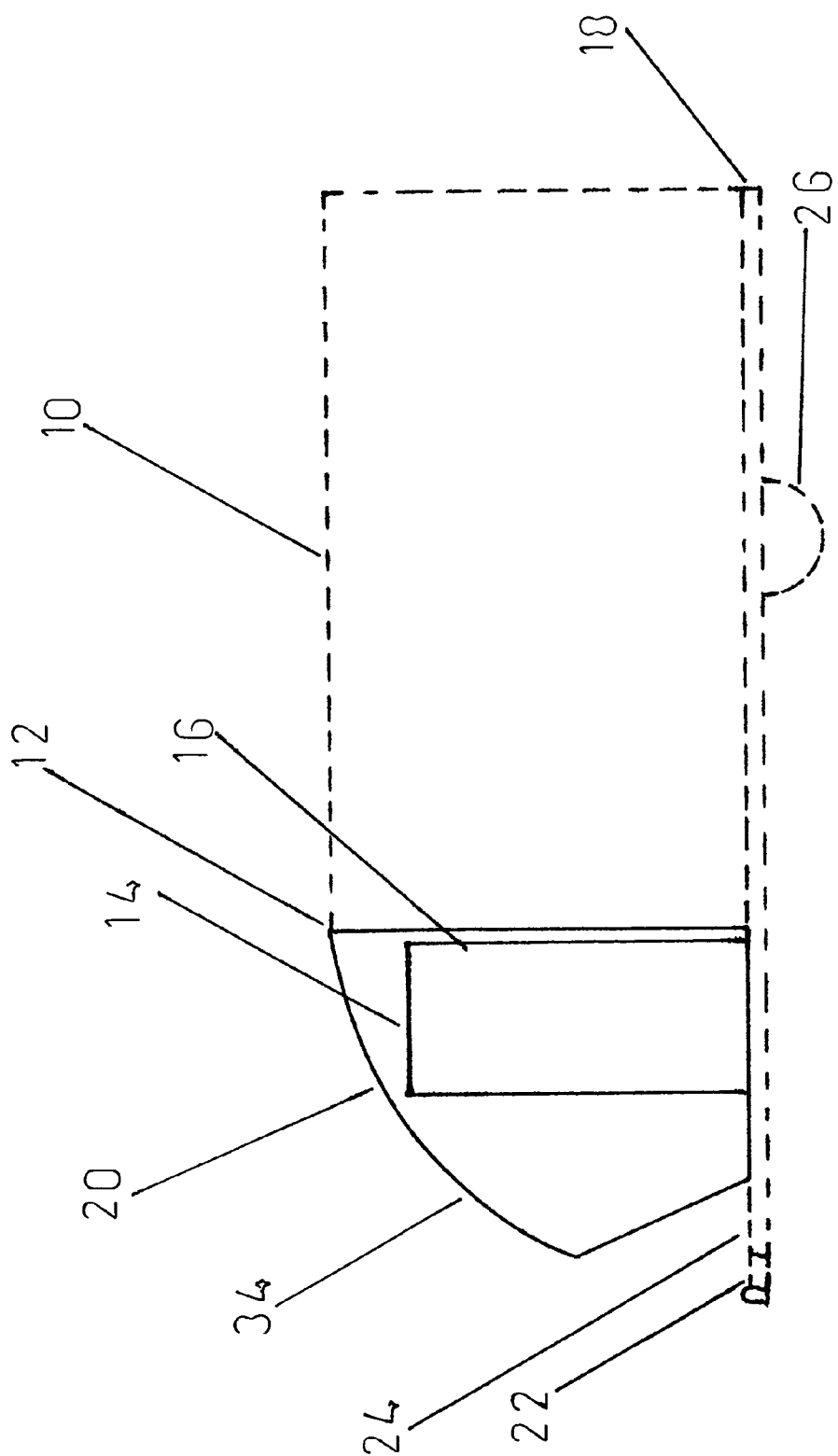
FIG. 2 is a left side view of a cap with doors of the preferred embodiment and the right side being a mirror of the same.

FIG. 2 shows the same left side elevation view of the preferred aerodynamic nose cone cap 20 design, but with added doors 14 and locks 16 for walk in entry. This is an aerodynamic design of a wind resistant cap 34 that makes the trailer yield better handling control to the driver while saving fuel. Also shown is the trailer body 10 and attaching point front wall of the trailer 12 with the cap 20. The trailers frame 18, at least one wheel 26, hitch 22, and the tongue part of the trailers frame 24, all are also shown. The right side elevation is the mirror of left.

Figure 3:
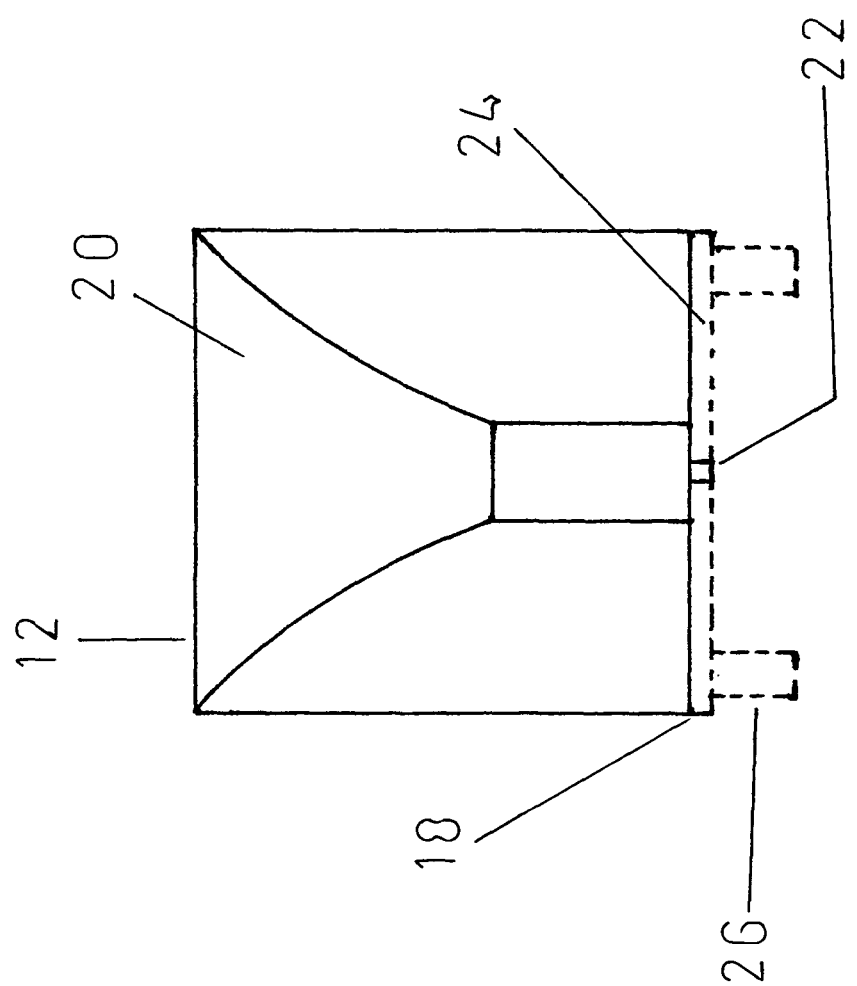
FIG. 3 is a front view of the preferred cap embodiment.

FIG. 3 shows a front elevation view of the preferred aerodynamic nose cone cap 20 attached to the tongue part of the trailer 24 and showing hitch 22, all sitting on at least one wheel 26. The frame of the trailer 18 supports the trailer body 10. The trailer body 10 and the aerodynamic nose cone cap 20 are attached at the common attaching point of the front wall of the trailer 12. After viewing the FIGS. 1-3, one can visualize how the wind resistant aerodynamic nose cone cap 20 with graceful functional line design makes the trailer yield better handling control to the driver. And at the same time it saves on fuel with its lightweight and superior shape design cap 20 over a flat front trailer.

Figure 4:
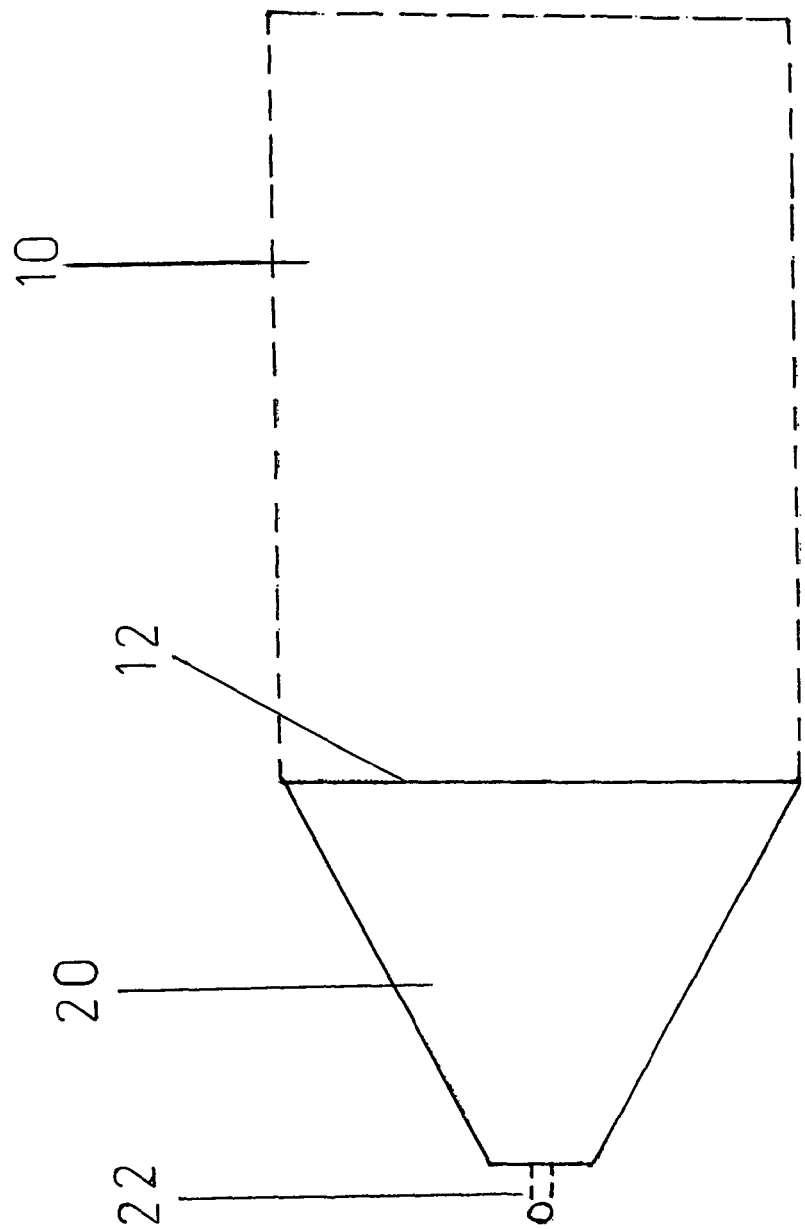
FIG. 4 is a topographical view of the preferred cap embodiment.

FIG. 4 is a topographical view of the preferred aerodynamic cap 20 embodiment showing the hitch 22, and the common attaching point the front wall of the trailer 12. One also views the outline of the trailer body 10. This is the best figure to show how the preferred aerodynamic cap 20 embodiment covers from a topographical view the complete tongue part of the trailer frame 24. The aerodynamic cap 20 covers from the hitch to the common attaching point of the front wall of the trailer 12.

Figure 5:
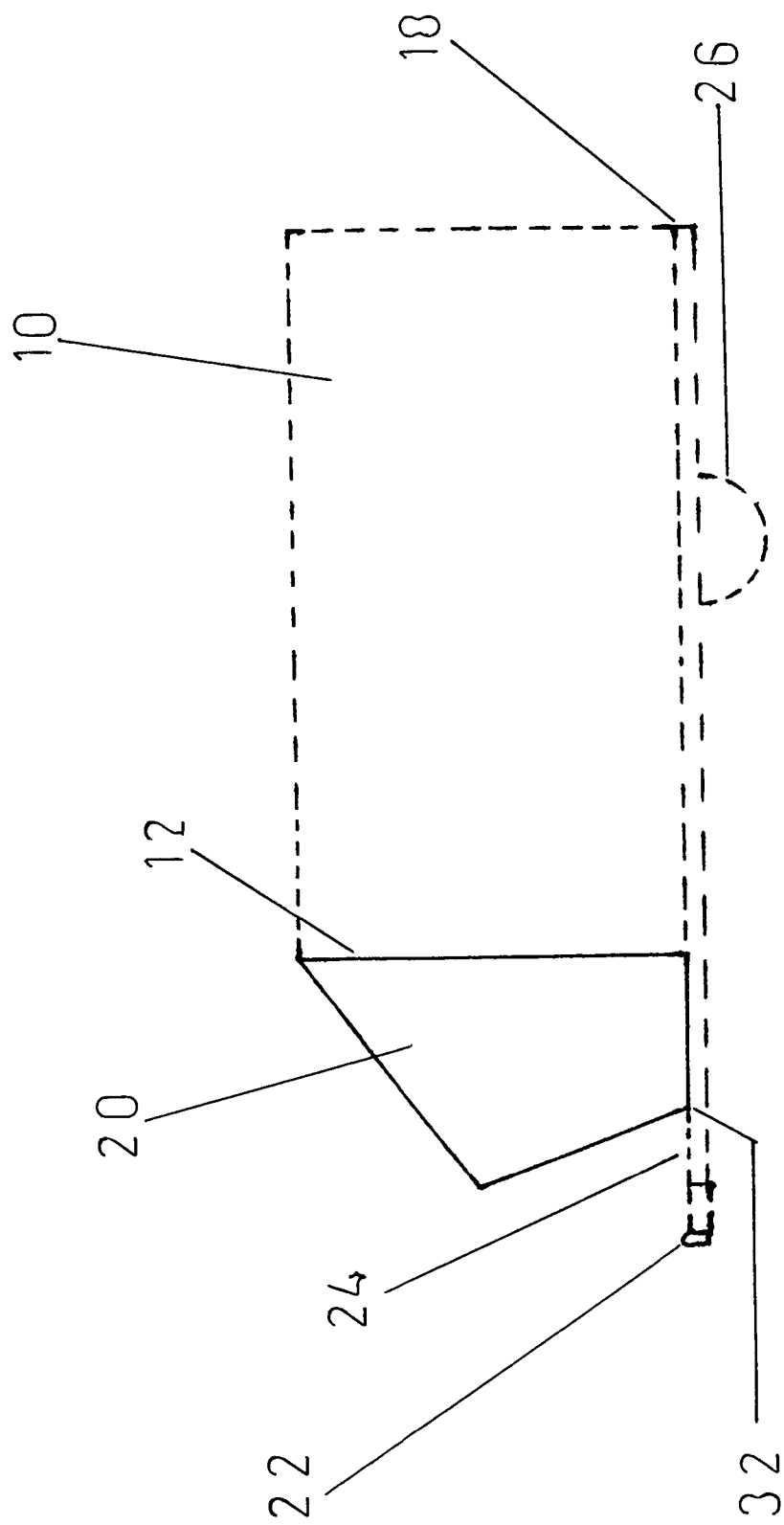
FIG. 5 is a left side view of the second embodiment designed aerodynamic nose cone cap and the right side being a mirror of the same both shown without doors.

FIG. 5 is a left side elevation view of the second embodiment designed aerodynamic nose cone cap and the right side being the mirror of the same. Both viewed sides are without doors. This second embodiment aerodynamic nose cone cap 20 has sharper lines in its design and has a pivoted hinge 32 that tilts the cap forward to use the created interior cap space 30. This design is just a variation of the preferred design cap 20 that from a topographical view covers the tongue part of the trailers frame 24 in the same manner. Also shown are: the hitch 22, tongue of the trailer frame 24, front wall of the trailer 12, trailer body 10, trailer frame 18, and at least one wheel 26.

Figure 6:
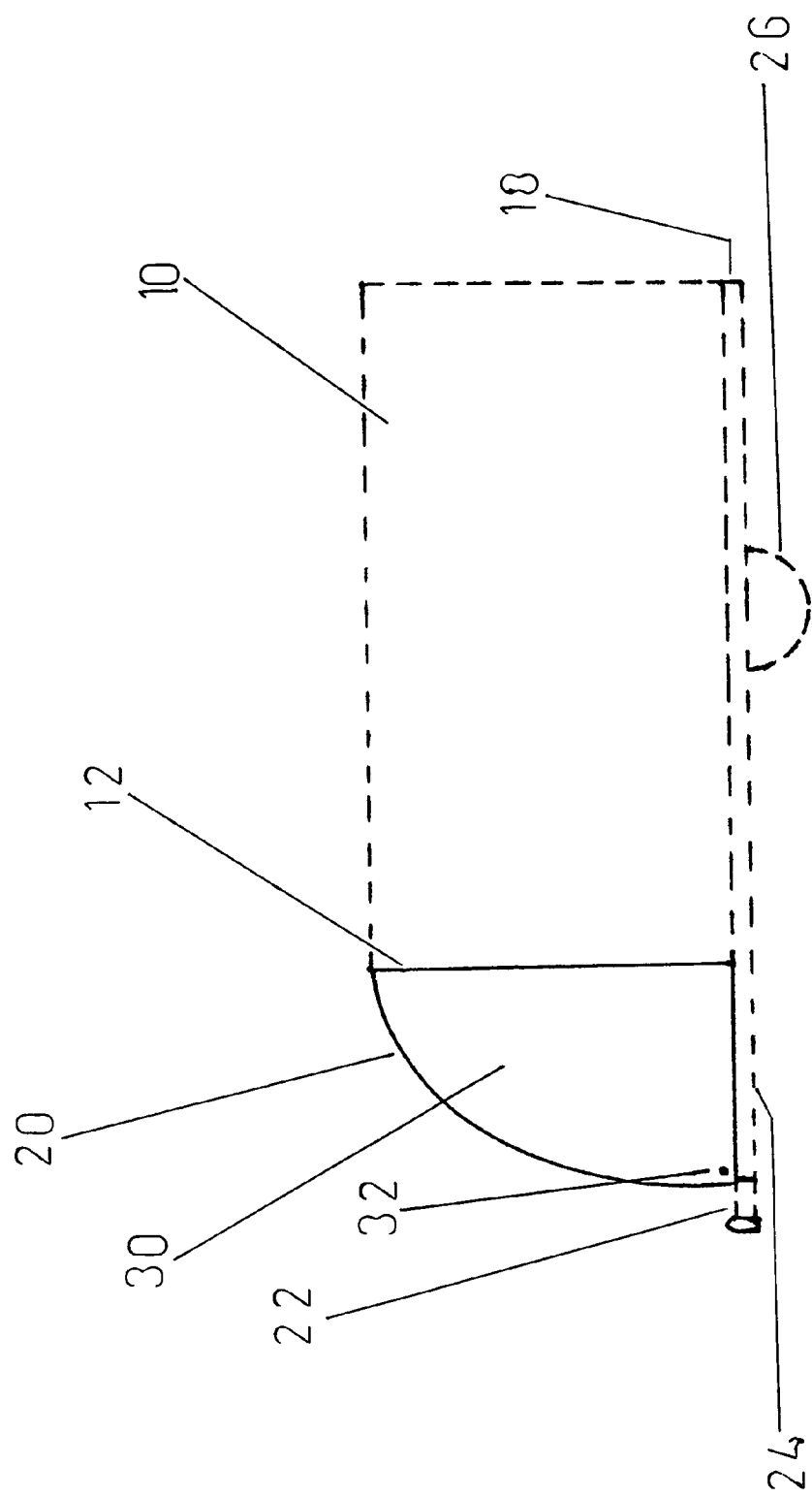
FIG. 6 is a left side view of the third embodiment designed aerodynamic nose cone cap and the right side being a mirror of the same both shown without doors.

FIG. 6 is a left side elevation view of the third embodiment designed aerodynamic nose cone cap 20 and the right side being the mirror of the same. Both viewed sides are without doors. This third embodiment aerodynamic nose cone cap 20 has a more aero wing shaped design sloping down again to the hitch 22 and has a pivoted hinge 32 that tilts the cap 20 forward to use the created interior cap space 30. This design is another variation of the preferred design cap 20 that from a topographical view covers the tongue of the trailers frame 24 in the same manner. Also shown are: the hitch 22, tongue part of the trailer 24, hinge 32, front wall of the trailer 12, trailer body 10, trailer frame 18, and at least one wheel 26.

Figure 7:
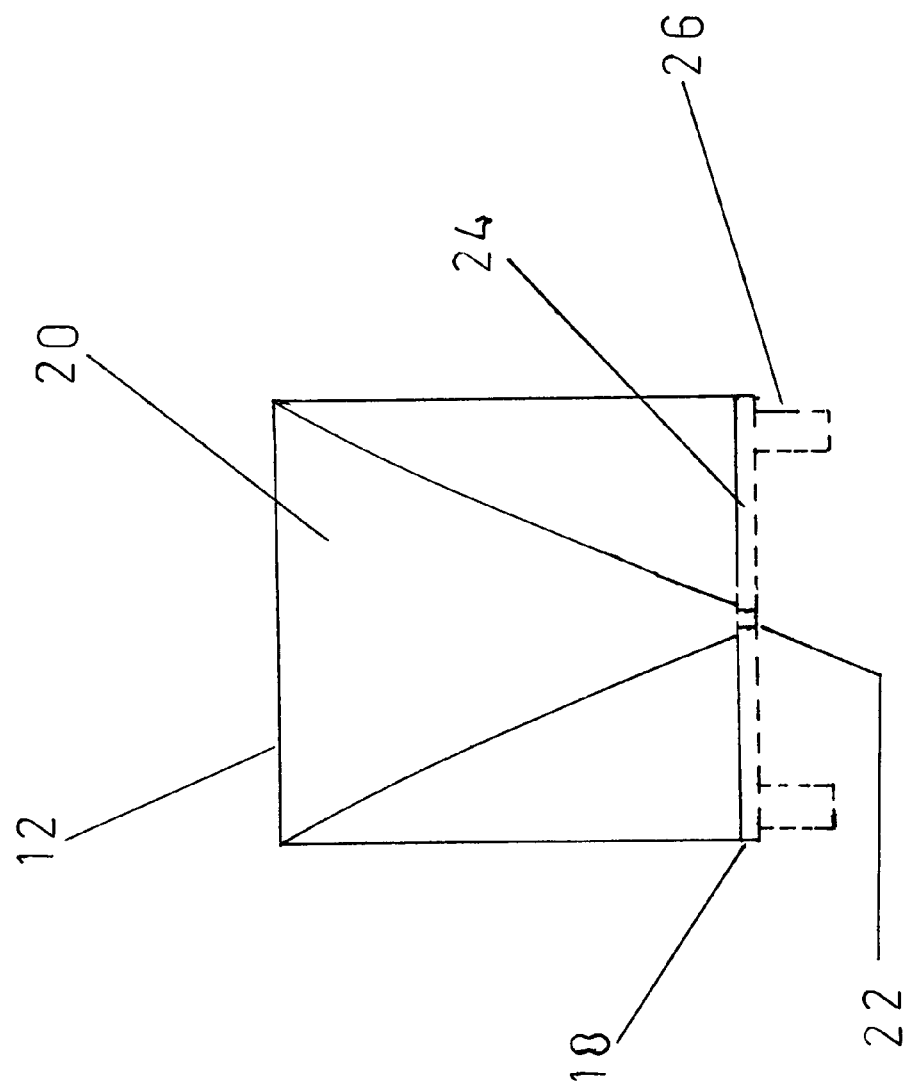
FIG. 7 is a front view of the third embodiment designed aerodynamic nose cone cap.

FIG. 7 is a front view of the third embodiment design which is slightly different from the preferred embodiment, but again covering all of the tongue part of the trailers frame 24. It covers from the hitch 22, and is attached to both the tongue part of the trailers frame 24 and the front wall of the trailer 12. Also shown are: the aerodynamic nose cone cap 20, trailers frame 18, and at least one wheel 26.

Thus there has been provided a aerodynamic nose cone cap that fully satisfies the objects and advantages set forth herein. While the invention has been described in conjunction with a preferred embodiment, it is evident that many embodiments other than the two shown have alternatives, modifications and variations will be apparent to those skilled in the art in light of the foregoing description such as using different designs and different materials. Accordingly, it is intended to embrace all such alternatives, modifications and variations.

What is claimed is:

1. An aerodynamic nose cone cap for attaching to the tongue part of a trailer, the trailer having a hitch, a trailer body, a trailer frame and at least one wheel, said cap comprising:
   an aerodynamic nose cone cap addition attached to both the tongue part of the trailer frame and the front wall of the trailer body to reduce wind resistance to improve fuel economy and improve handling;
   the aerodynamic nose cone cap addition extends from the hitch to the front wall of the trailer body covering the tongue part of the trailer frame;
   a door located in the front wall of the trailer body for walk in entry into the interior space defined within the aerodynamic nose cone cap addition, the interior space is adapted for storage, hygiene, workshop, and utility purposes;
   a floor attached to both the aerodynamic nose cone cap addition and the tongue part of the trailer frame; and
   the aerodynamic nose cone cap addition is constructed of a rigid material.

2. The aerodynamic nose cone cap of claim 1, wherein the rigid material is at least one of fiberglass and metal.

3. The aerodynamic nose cone cap of claim 1, wherein a hinge is attached to a forward portion of the aerodynamic nose cone cap addition such that the aerodynamic nose cone cap can pivot about the hinge to provide access to the interior space.

4. The aerodynamic nose cone cap of 1, wherein the aerodynamic nose cone cap addition has at least one door for walk in entry into the interior space.

5. The aerodynamic nose cone cap of claim 4, wherein the door of the aerodynamic nose cone cap addition has a security lock.

6. A molded, hollow aerodynamic nose cone cap attached to a trailer that has a hitch, a trailer body, a trailer frame with a tongue part, and at least one wheel, said cap comprising:

an aerodynamic nose cone cap addition attached to both the tongue part of the trailer frame and the front wall of the trailer body to reduce wind resistance to improve fuel economy and improve handling;

the aerodynamic nose cone cap addition extends from the hitch to the front wall of the trailer body covering the tongue part of the trailer frame;

a door located in the front wall of the trailer body for walk in entry into the interior space defined within the aerodynamic nose cone cap addition, the interior space is adapted for storage, workshop, hygiene, and utility purposes;

a floor that is contoured to the aerodynamic nose cone cap addition is attached to both the aerodynamic nose cone cap addition and the tongue part of the trailer frame; and the aerodynamic nose cone cap addition is constructed of a rigid material.

7. The aerodynamic nose cone cap of claim 6, wherein the rigid material is at least one of fiberglass and metal.

* * * * *